(No Model.) 4 Sheets—Sheet 1.

J. R. WOODBURN.
PULVERIZING MACHINE.

No. 334,098. Patented Jan. 12, 1886.

Witnesses:
Thomas W. Peters
Joseph S. Wm...

Inventor:
James R. Woodburn
per Edward T. C. Knowles
Attorney (No Model.) 4 Sheets—Sheet 2.

J. R. WOODBURN.
PULVERIZING MACHINE.

No. 334,098. Patented Jan. 12, 1886.

Witnesses:
Thomas W. Peters
Joseph S. Knowles

Inventor:
James R. Woodburn
per Edward P. C. Knowles
Attorney (No Model.) 4 Sheets—Sheet 3.
J. R. WOODBURN.
PULVERIZING MACHINE.
No. 334,098. Patented Jan. 12, 1886.
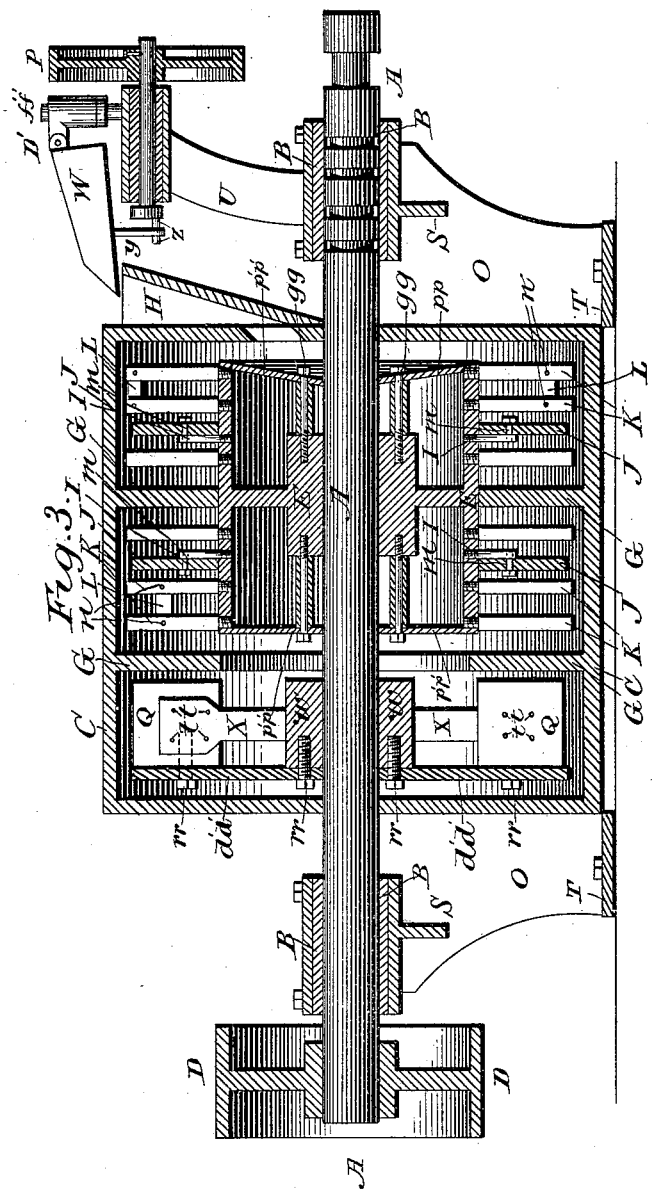
Witnesses:
Thomas W. Peters
Joseph S. Knowles
Inventor.
James R. Woodburn
per Edward P. C. Knowles
Attorney (No Model.)  4 Sheets—Sheet 4.
J. R. WOODBURN.
PULVERIZING MACHINE.
No. 334,098.  Patented Jan. 12, 1886.
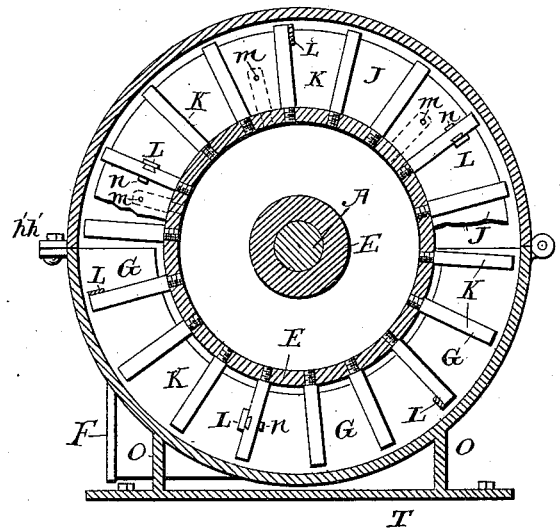
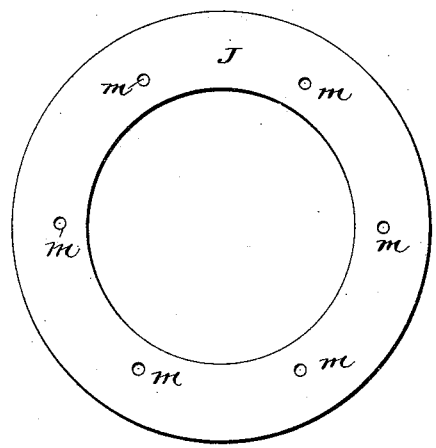
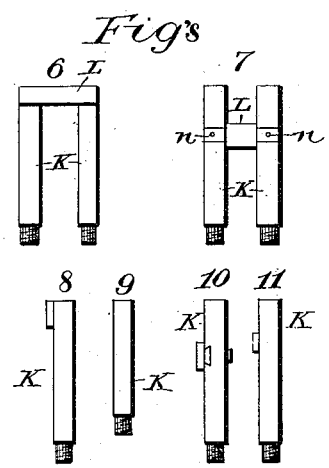
Witnesses:
Thomas W. Peters
Joseph S. Knowles
Inventor.
James R. Woodburn
per Edward T. C. Knowles
Attorney

UNITED STATES PATENT OFFICE.

JAMES R. WOODBURN, OF ST. JOHN, NEW BRUNSWICK, CANADA.

PULVERIZING-MACHINE.

SPECIFICATION forming part of Letters Patent No. 334,098, dated January 12, 1886.

Application filed May 18, 1885. Serial No. 165,962. (No model.)

*To all whom it may concern:*

Be it known that I, JAMES R. WOODBURN, of the city of St. John, in the county of St. John and Province of New Brunswick, Canada, a British subject, have invented certain new and useful Improvements in Pulverizing-Machines, of which the following is a specification.

My invention relates to improvements in machines or mills for pulverizing sugar and other friable substances; and the objects of my improvements are, first, in mills pulverizing by means of stationary and revolving diaphragms, as herein described, to cause the material being pulverized to be more thoroughly brought in contact with the disintegrating mechanism, and so more quickly and evenly reduced to an impalpable powder, than can be done with machines now in use; second, in mills pulverizing by means of numerous blades presenting many hard, sharp edges, as herein described, to secure a more cheap, rapid, and thorough disintegration of the material to be pulverized than can be done with mills now in use; third, by the use of such blades to lessen the escape of the saccharine properties of the sugar being pulverized. I attain these objects by means of the mechanism illustrated in the accompanying drawings, in which—

Figure 1:
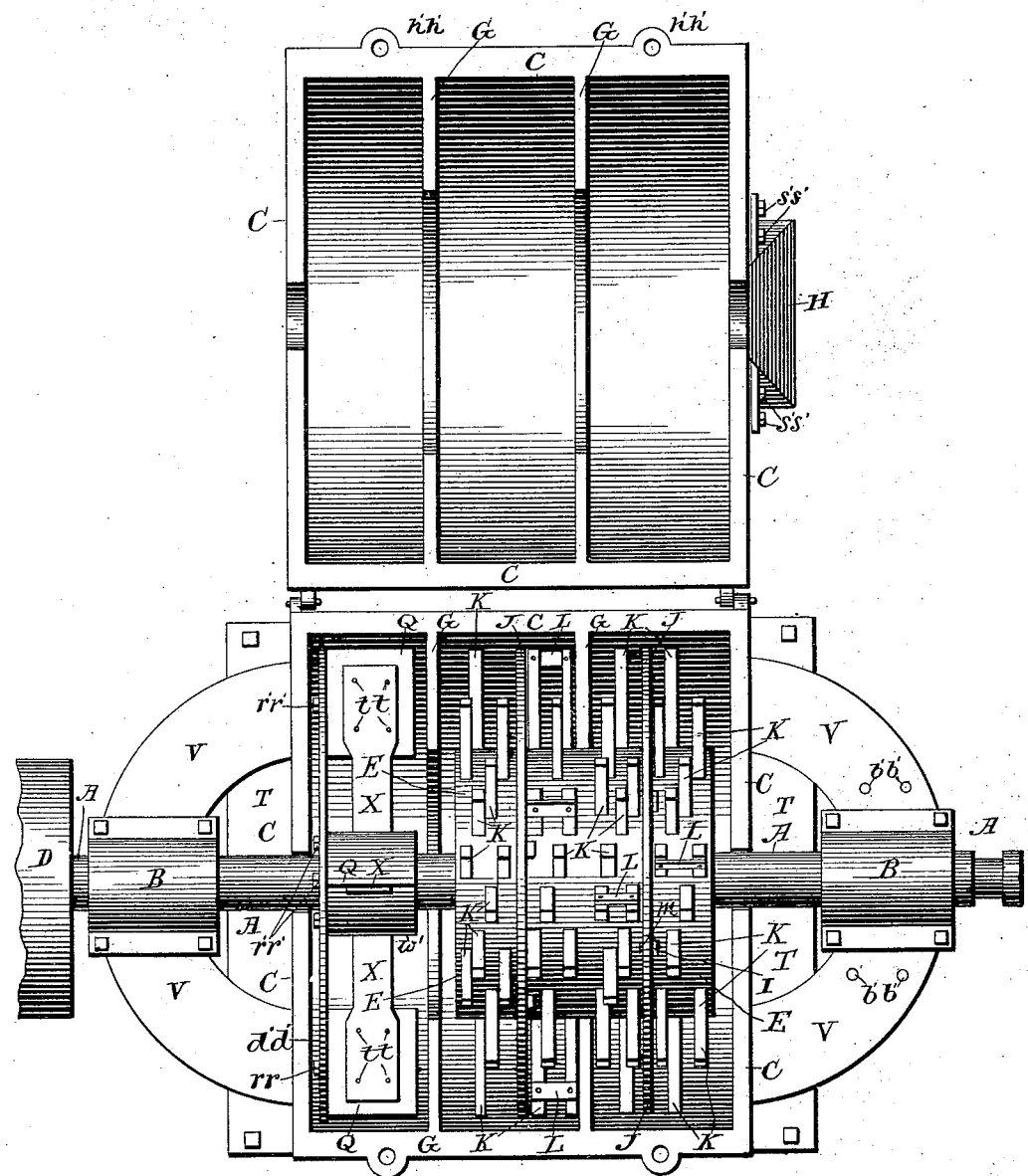
Figure 12:
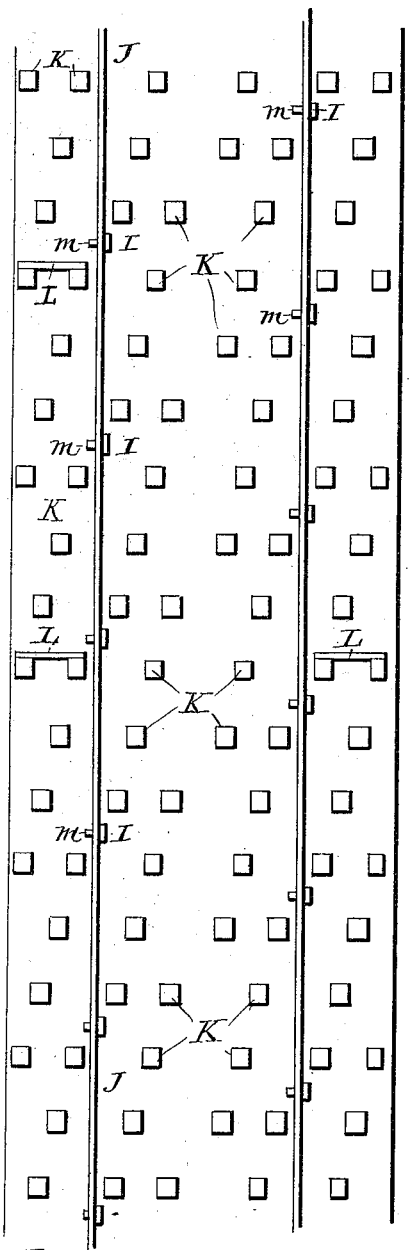
Figure 2:
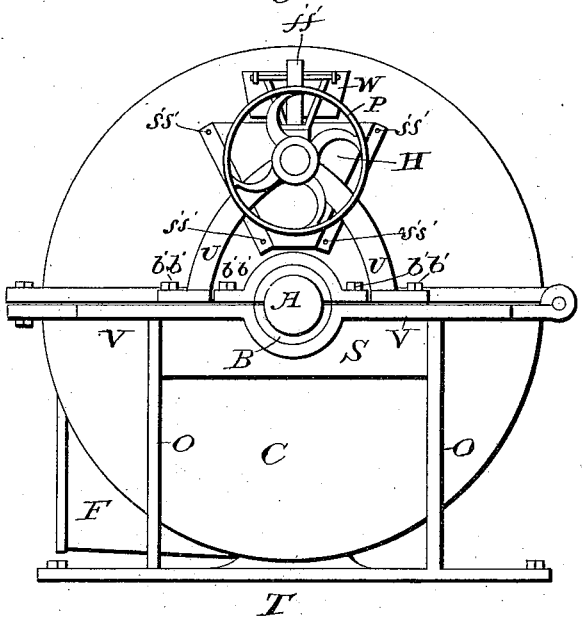

Figure 1 is a top view of the machine with the cover thrown back. Fig. 2 is an end view thereof. Fig. 3 is a longitudinal vertical section thereof. Fig. 4 is a vertical cross-section thereof, showing in the upper half of the figure a portion of one of the revolving diaphragms and in the lower part a portion of one of the stationary diaphragms or partitions. Fig. 5 represents one of the revolving diaphragms detached from the mill. Figs. 6, 7, 8, 9, 10, and 11 are detail views of the blades K and cross-blades L. Fig. 12 illustrates the development of the periphery of the drum E, showing the positions of the upright metal blades K.

Similar letters refer to similar parts throughout the several views.

The metal shaft A, resting in pillow-blocks B B, passes horizontally through the center of the outer case, C, and terminates in the driving-pulley D. The outer case, C, consists of two semi-cylindrical parts hinged together, as shown in the drawings. The upper part, having in it the inlet-chute H, forms the cover of the machine, and when the mill is working it should be securely bolted to the lower part at $h'$ $h'$. These upper and lower parts correspond one to the other in size, and, by means of the stationary diaphragms or partitions G, are divided, when the mill is closed, into three compartments. In the compartment nearest to the driving-pulley is placed the fan X. The other two compartments are the pulverizing-chambers. If the material to be pulverized is of a refractory nature, the mill may be lengthened, and by the use of additional diaphragms the number of pulverizing-chambers increased. The stationary diaphragms are semi-annular in shape, and when the mill is closed they conform to the drum E, sufficient space being left between the outer periphery of the drum and the inner edges of the diaphragms to allow the material being pulverized to pass from the one pulverizing-chamber to the other. A space of one-half inch would be sufficient for pulverizing materials of ordinary friability. These diaphragms may be fastened to the inner surface of the outer case, C, by means of screws, rivets, or other fastenings; or they may be cast with the outer case. I place a packing of rubber or other suitable substance between the upper and lower parts of the outer case and of the stationary diaphragms G wherever they meet one another, so as to prevent the escape of the material being pulverized except through the openings provided for that purpose. The pulverizing-chambers formed by the diaphragms G G are subdivided by the revolving diaphragms J J. These are metal disks annular in shape, and are fastened to the outer periphery of the drum E by means of bolts, screws, or rivets; or they may be fastened, as shown in the drawings, Fig. 3, by means of the screws $m$ through the arms I, which are screwed into the drum E. There should be a space of, say, one-half of an inch between the outer circumference of the revolving diaphragms J J and the inner periphery of the outer case, C, to allow the material being pulverized to pass from the one part of the pulverizing-chamber to the other. The metal blades K project radially from the outer periphery of the drum E. They are screwed, riveted, or otherwise fastened into the drum.

The ends of these blades farthest from the shaft should approach to within, say, half an inch of the inner periphery of the outer case. The size of such blades in a mill the outer case of which is twenty-one inches in diameter should be as follows: say five-eighths of an inch square, and extending from the outer periphery of the drum, say, five inches. I place in each of the pulverizing-chambers formed by the stationary diaphragms G forty-eight of such blades—namely, twenty-four of such blades in each of the sub-chambers formed by the revolving diaphragms J—and these blades I arrange on the outer periphery of the drum at the intervals and in the order of development indicated in Fig. 12 of the drawings. As shown in said Fig. 12, each pair of parallel blades is preceded and followed by two other blades placed, as it were, in echelon, or diagonally across the sub-chambers formed by the diaphragms J, so that if the blades so placed in echelon in each series of blades were brought back in straight lines between the pair of parallel blades next them, respectively, they would slightly more than fill the space between such parallel blades. The cross-blades L L, which are nearly of the same size as the radial blades K, are necessary only when the material to be pulverized is of an unusually refractory nature. They are fastened by means of screws, bolts, or rivets across each pair of parallel blades at intervals, as follows: Beginning with any pair of parallel radial blades, fasten one of the blades L across them at right angles at the ends of such blades K nearest to the inner surface of the outer case, and on the next succeeding pair of parallel radial blades fasten another cross-blade at right angles, but nearer to the drum—say one-half an inch nearer—and so on each succeeding pair of parallel radial blades in like manner place a cross-blade, but in each instance a like distance nearer to the drum-surface, and so do in each subdivision of the pulverizing-chambers. The cross-blades may be placed at other angles and intervals than those above described.

In Fig. 12 the entire periphery of the drum is represented as if it were spread out on a level plane, and having marked on it the position of each of the radial blades K. The blades K and L are preferably either of steel or of iron case-hardened, and all the edges of such blades should be kept well sharpened. The blades K should be harder at the ends of them most distant from the drum-surface and for, say, two-thirds of the distance from such ends to the drum than the remaining one-third, so that in the event of any hard body finding its way into the mill and coming in contact with the blades they may be bent rather than broken. The number of the blades K and L may be increased or diminished, and they may be arranged at other intervals than those described, and may be fastened into the periphery of the drum in other ways than those stated, and they may be larger or smaller or of other shape than those described, as the material to be pulverized is of a more or less refractory nature. I describe such blades and so many and so placed as I deem best for pulverizing sugar and other substances of like friability.

The drum E is a metal cylinder with closed ends—namely, the plates $p'$. It may be either of iron or steel, preferably steel. The shaft A passes through its center. The drum is fastened or keyed to the shaft in the usual way. The end plates, $p'$, are fastened by the screws $g$ into the heads of the drum E. The plate forming the head of the drum nearest to the inlet-chute H should be cupped, so as to give increased room for the admission of the material to be pulverized, as in Fig. 3.

In a mill such as I am describing the drum E should be, say, eleven inches long by eleven inches in diameter; but these proportions may be varied.

X Q is an ordinary exhaust-fan—X, the arms; Q, the paddles, riveted at $t\ t$.

$w'$ is the hub of the fan.

$d'$ is an annular metal disk which fits closely to the shaft A, and is screwed to the hub $w'$ and the arms X by the screws $r'$, leaving only the side of the fan next the mill open.

H is the inlet-chute to admit the material to be pulverized. It is fastened to the outer case, C, by the screws $s'$.

W is an ordinary shaker, operated by the pulley P, driven by a belt from the shaft A. The shaking motion is given by the pin $z$, working in the slot $y$. The shaker W is hung upon the rod $f'$, as shown in Fig. 3, and is hinged at D', so that its mouth may be raised or lowered, as required. The feeding mechanism is supported by the brackets U, resting on the shelves V, to which they are fastened by the screws $b'$. The shelves V, upon which rest the pillow-blocks B and the brackets U, are attached to the lower part of the outer case, C, at each end of said case, and at that part of it where the upper part or cover of the case meets the said lower part it is supported by the brackets O, springing from the foot-plates T. These brackets are strengthened by the cross-bar S. The foot-plates T should be screwed to the floor, so that the mill may be kept steady while being operated.

I drive the mill by steam-power connected by a belt at D. Other power may be used.

The mill, except where otherwise indicated, is preferably made of iron, that it may be strong and durable. The fan-paddles may be of galvanized iron.

The mill may be worked as follows: Let the material to be pulverized be fed to the mill through the inlet-chute H by the mechanism described, or by any other suitable feeding mechanism. The particles, on entering the mill, by the action of the exhaust-fan and rapidly-revolving blades, are, in their whirling motion, brought continuously and violently in contact with the hard sharp edges of such blades, and so begin to be disintegrated by them. Then they are drawn by a current of air created by the exhaust-fan through the opening between the revolving diaphragm J and the outer case, C, into the second subdivision of the first pulverizing-chamber, where they are further disintegrated by like contact with the hard sharp edges of the blades revolving in such second subdivision of the first pulverizing-chamber. Then they are drawn by the fan-draft through the axial opening between the stationary diaphragm G and the drum E into the first subdivision of the second pulverizing-chamber, where they are yet further disintegrated by like contact with the hard sharp edges of the blades in such last-mentioned subdivision, and then drawn by the fan-draft into the next and last subdivision of the pulverizing-chambers, where they are still further reduced by contact with the blades in such last-mentioned subdivision to an impalpable powder, and then being drawn by the fan-draft into the fan-chamber are expelled from the mill through the outlet F in such fan-chamber.

I claim as my invention—

1. The combination, in a pulverizing-mill, with the annular central diaphragms, J, and the stationary diaphragms G, of the case C and the drum E, having the radial blades K, substantially as and for the purposes described.

2. The combination, in a pulverizing-mill, of the shaft A, the case C, the drum E, the stationary diaphragms G, the revolving diaphragms J, the blades K, and the fan X Q, whereby the material being pulverized is directed in its course through the mill and continuously and violently brought in contact with the many hard sharp edges of the swiftly-revolving blades K in a series of pulverizing-chambers and sub-chambers, as described, and for the purposes stated.

3. The combination, in a pulverizing-mill, of the shaft A, the case C, the diaphragms G, and the fan X Q, with the drum E, having the blades K and L and diaphragms J, whereby the material being pulverized, in its course through the mill, is forced to pass alternately circumferentially and axially from one to another of a series of pulverizing-chambers and sub-chambers, substantially as and for the purposes described.

JAMES R. WOODBURN.

Witnesses:
EDWARD T. C. KNOWLES,
LEMUEL A. CURREY.